United States Patent
Igarashi et al.

(10) Patent No.: US 7,907,622 B2
(45) Date of Patent: Mar. 15, 2011

(54) GATEWAY DEVICE, COMMUNICATION METHOD AND PROGRAM

(75) Inventors: Tatsuya Igarashi, Tokyo (JP); Kenji Fujisawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 73 days.

(21) Appl. No.: 12/413,888

(22) Filed: Mar. 30, 2009

(65) Prior Publication Data

US 2009/0245267 A1    Oct. 1, 2009

(30) Foreign Application Priority Data

Mar. 28, 2008  (JP) ................. P2008-088081

(51) Int. Cl.
  *H04L 12/28* (2006.01)
(52) U.S. Cl. ..................... 370/401; 370/352
(58) Field of Classification Search ............. None
See application file for complete search history.

(56) References Cited

U.S. PATENT DOCUMENTS

| | | | |
|---|---|---|---|
| 2007/0121584 A1 | 5/2007 | Qiu et al. | |
| 2007/0242659 A1* | 10/2007 | Cantu et al. | 370/352 |
| 2009/0017796 A1* | 1/2009 | Foti | 455/414.1 |
| 2009/0176480 A1* | 7/2009 | Jones et al. | 455/411 |
| 2009/0190549 A1* | 7/2009 | Kim et al. | 370/331 |
| 2009/0203359 A1* | 8/2009 | Makhoul et al. | 455/412.2 |
| 2009/0222858 A1* | 9/2009 | Hjelm et al. | 725/47 |
| 2009/0225760 A1* | 9/2009 | Foti | 370/400 |

FOREIGN PATENT DOCUMENTS

| | | |
|---|---|---|
| JP | 2002-305547 | 10/2002 |
| JP | 2004-240856 | 8/2004 |
| JP | 2007-272868 | 10/2007 |
| WO | WO2007/102550 A1 | 9/2007 |
| WO | WO 2007/140834 A1 | 12/2007 |

* cited by examiner

*Primary Examiner* — Phirin Sam
(74) *Attorney, Agent, or Firm* — Finnegan, Henderson, Farabow, Garrett & Dunner, L.L.P.

(57) ABSTRACT

A gateway device compatible with a synchronous transaction network and an asynchronous transaction network includes a communicating means communicating with a synchronous transaction network-compatible device and an asynchronous transaction network, and a holding means holding a transaction request received from the synchronous transaction network-compatible device, and, when an event is received from the asynchronous transaction network-compatible device, transmits a message including the event to the synchronous transaction network-compatible device via the communicating means as a response to the transaction request held in the holding means.

8 Claims, 9 Drawing Sheets

GATEWAY DEVICE, COMMUNICATION METHOD AND PROGRAM

CROSS REFERENCES TO RELATED APPLICATIONS

The present invention contains subject matter related to Japanese Patent Application JP 2008-088081 filed in the Japan Patent Office on Mar. 28, 2008, the entire contents of which being incorporated herein by reference.

BACKGROUND OF THE INVENTION

1. Field of the Invention

The present invention relates to a gateway device, a communication method and a program.

2. Description of the Related Art

A system of a so-called Internet Protocol Television (IPTV) service delivering video content using Internet Protocol (IP) is being developed and commercialized by various vendors such as Microsoft Corporation, US. In recent years, an IPTV service using an IP Multimedia Subsystem (IMS) is attracting attention.

The IMS is basically a communication scheme developed by $3^{rd}$ Generation Partnership Project (3GPP) as an infrastructure technology providing, aside from telephone service for voice, additional services of multimedia in a wireless communication infrastructure of a mobile telephone. The IMS is built based on IP technology, and has high affinity with the infrastructure of the fixed-line Internet. Further, in the trend of integrating by IP wired/wireless communication network infrastructures, i.e. so-called Fixed Mobile Convergence (FMC), by applying the IMS to IPTV, Quality of Service (QoS) for content delivery can be realized, and at the same time, a communication service such as sending of a message to a mobile telephone or chat can be provided in coordination with the IPTV service.

Figure 1:
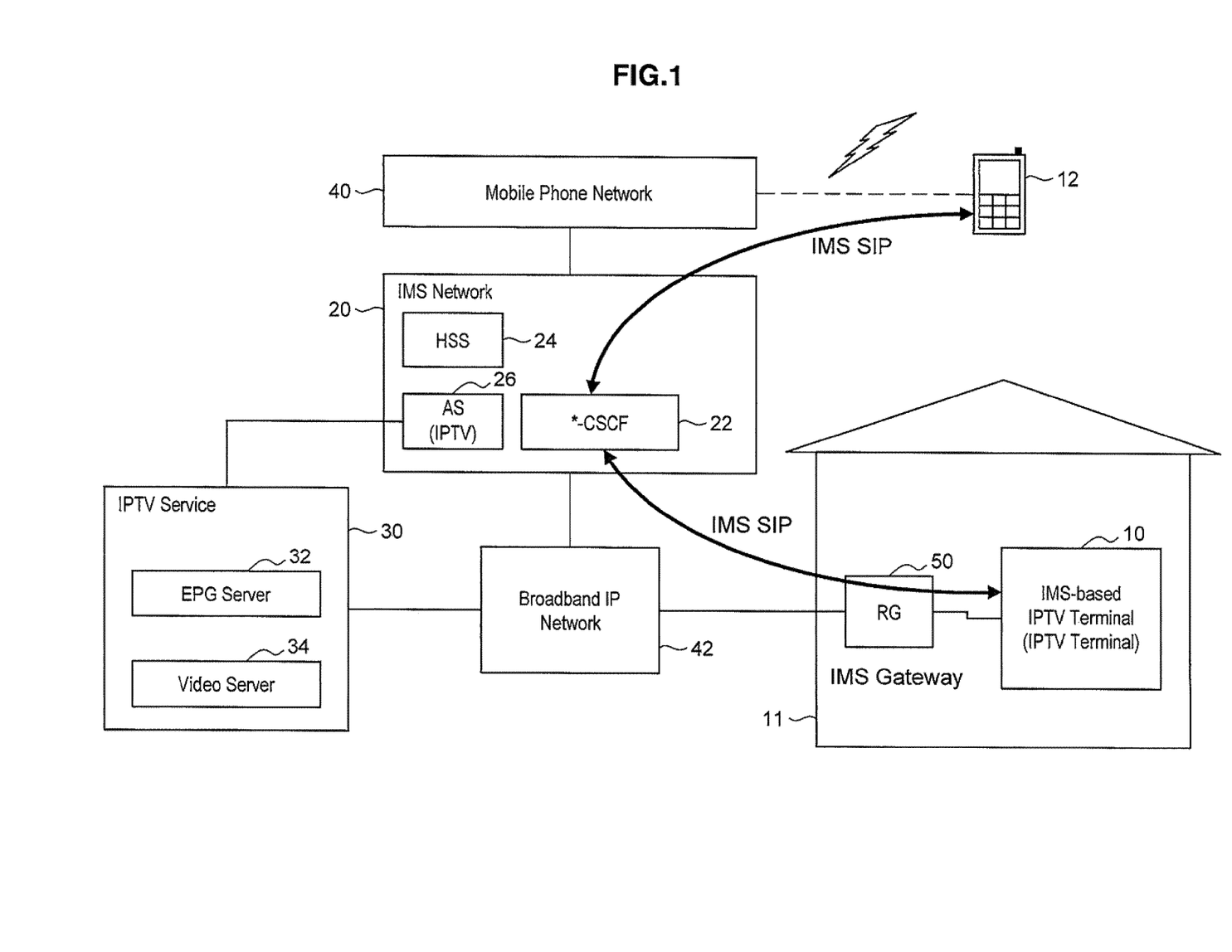
FIG. 1 is a schematic configuration diagram showing a configuration of an IPTV system using a general IMS.

FIG. 1 shows an architecture of the IPTV system using the IMS. As shown in FIG. 1, the IMS is configured by functional elements, such as a Home Subscriber Subsystem (HSS) 24, an Application Server (AS) 26 and the like, with a functional element called a Call Session Control Function (CSCF) 22 based on Session Initiation Protocol (SIP) as the core. The SIP is a communication protocol defined by Request For Comment-3261 (RFC-3261) of Internet Engineering Task Force (IETF).

The mechanism of such IMS is schematically described. User terminals 10 and 12, for which user IDs are set, access the CSCF 22 of an IMS network 20, and registration of the user terminal 10 and 12 and setting control of a session are performed. During this procedure, a process by the AS 26 corresponding to a necessary service is initiated according to the setting of a user profile registered in the HSS 24. The AS 26 is a server for performing a process to actually provide individual service.

For example, with a chat application (PushToTalk) which is an example of a service using the IMS, the user terminal 12 which is, for example, a mobile telephone, connects to the AS 26 in charge of PushToTalk in the IMS network 20 via a mobile telephone network 40. Then, the user terminal 12 establishes a session with the terminals of a plurality of registered group members (not shown) through the AS 26, and by using Voice over Internet Protocol (VoIP), communicates with the members via a relay server.

Further, as another example of the service using the IMS, in the IPTV system of the IMS, the AS 26 of the IPTV service is provided in the IMS network 20. The user terminal 10 at home, for example, a Set Top Box (STB), can receive the IPTV service by being connected to the AS (IPTV) 26 in the same manner. The AS (IPTV) 26 realizes an IPTV service 30 in cooperation with an Electronic Program Guide Server (EPG server) 32 actually managing the IPTV service 30 and a video server 34 delivering video contents.

SUMMARY OF THE INVENTION

Incidentally, the IMS of a related art assumes a case where the user terminal 12 supports SIP. On the other hand, with the user terminal (IPTV terminal) 10 using an HTML browser as a technology for a user interface presenting an EPG screen or a service screen to a user, various applications can be realized by a service provider, such as customization of the screen design by the service provider. For example, the EPG server 32 as shown in FIG. 1 is configured by a HyperText Transfer Protocol (HTTP) server. The EPG server 32 provides an HTML document configuring an EPG screen to the IPTV terminal 10 via a broadband IP network 42.

With this architecture, a mechanism is conceived of introducing a gateway (GW) device 50 called an "IMS Gateway" in a user's home 11 so that the IPTV terminal 10 does not have to directly support the protocol called SIP. The IMS gateway device 50 functions as a conversion device converting data of SIP communication of the IMS to data in HTTP which is a protocol supported by the HTML browser of the IPTV terminal 10.

However, since the communication procedure is different for HTTP and SIP, it is necessary to assign an application for performing such protocol conversion to the IMS gateway device 50 to convert the SIP protocol to a highly abstract high-level interface, and to transmit a message call in Simple Object Access Protocol (SOAP) or the like in HTTP. Thus, to implement such an application gateway, the IMS gateway device 50 has to have many hardware resources, such as a CPU, a memory and the like, and there is a problem of the IMS gateway device 50 becoming expensive.

Thus, in view of the foregoing, it is desirable to provide a new and improved gateway device, a communication method and a program capable of reducing hardware resources, such as a CPU, a memory and the like, by converting data in different protocols (for example, HTTP and SIP) using a simple method between a synchronous transaction network and an asynchronous transaction network.

According to an embodiment of the present invention, there is provided a gateway device compatible with a synchronous transaction network and an asynchronous transaction network, including a communicating means communicating with a synchronous transaction network-compatible device and an asynchronous transaction network-compatible device, and a holding means holding a transaction request received from the synchronous transaction network-compatible by the communicating means, wherein, when an event is received from the asynchronous transaction network-compatible device by the communicating means, the gateway device transmits a message including the event to the synchronous transaction network-compatible device via the communicating means as a response to the transaction request held in the holding means.

Further, when a notification other than the event is received from the asynchronous transaction network-compatible device by the communicating means, a response to the transaction request held in the holding means may be transmitted to the synchronous transaction network-compatible device via the communicating means, and also a response to the notification other than the event may be transmitted to the asynchronous transaction network-compatible device via the communicating means.

Further, in case a notification is not received from the asynchronous transaction network-compatible device for more than a predetermined time, a response to the transaction request held in the holding means may be transmitted to the synchronous transaction network-compatible device via the communicating means.

Further, the communication protocol of the synchronous transaction network may be HTTP, and the communication protocol of the asynchronous transaction network may be SIP.

According to another embodiment of the present invention, there is provided a communication method of a gateway device compatible with a synchronous transaction network and an asynchronous transaction network, including the steps of receiving a transaction request from a synchronous transaction network-compatible device, holding the transaction request in a holding means, receiving an event from an asynchronous transaction network-compatible device, and transmitting, in response to receiving the event, a message including the event to the synchronous transaction network-compatible device as a response to the transaction request held in the holding means.

Further, the steps of receiving a notification other than the event from the asynchronous transaction network-compatible device, and transmitting, in response to receiving the notification other than the event, a response to the transaction request held in the holding means to the synchronous transaction network-compatible device and also a response to the notification other than the event to the asynchronous transaction network-compatible device may be included.

Further, the step of transmitting, in case a notification is not received from the asynchronous transaction network-compatible device for more than a predetermined time, a response to the transaction request held in the holding means to the synchronous transaction network-compatible device may further be included.

Further, the communication protocol of the synchronous transaction network may be HTTP, and the communication protocol of the asynchronous transaction network may be SIP.

According to another embodiment of the present invention, there is provided a program tangibly stored in a computer-readable medium for causing a computer of a gateway device compatible with a synchronous transaction network and an asynchronous transaction network to execute the steps of receiving a transaction request from a synchronous transaction network-compatible device, holding the transaction request in a holding means, receiving an event from an asynchronous transaction network-compatible device, and transmitting, in response to receiving the event, a message including the event to the synchronous transaction network-compatible device as a response to the transaction request held in the holding means.

With such configuration, a transaction request is received from a synchronous transaction network-compatible device, the transaction request is held in a holding means, an event is received from an asynchronous transaction network-compatible device, and, in response to receiving the event, a message including the event is transmitted to the synchronous transaction network-compatible device as a response to the transaction request held in the holding means. Thus, a message in a first protocol (for example, SIP) for an asynchronous transaction network can be easily converted to a message in a second protocol (for example, HTTP) for a synchronous transaction network to be provided to the synchronous transaction network-compatible device.

As described above, according to the present invention, since data in different protocols (for example, HTTP and SIP) can be converted using a simple method between a synchronous transaction network and an asynchronous transaction network, hardware resources, such as a CPU, a memory and the like, to be loaded on a gateway device can be reduced.

DETAILED DESCRIPTION OF THE PREFERRED EMBODIMENTS

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

First Embodiment

Hereunder, an IPTV system including an IMS gateway device according to a first embodiment of the present invention will be described. As in FIG. 1, the IPTV system is configured by an IPTV terminal and the IMS gateway device 50 configuring a home network at the user's home 11, various servers 32, 34 providing the IPTV service 30, and the CSCF 22, the HSS 24 and the AS 26 configuring the IMS network 20.

Figure 2:
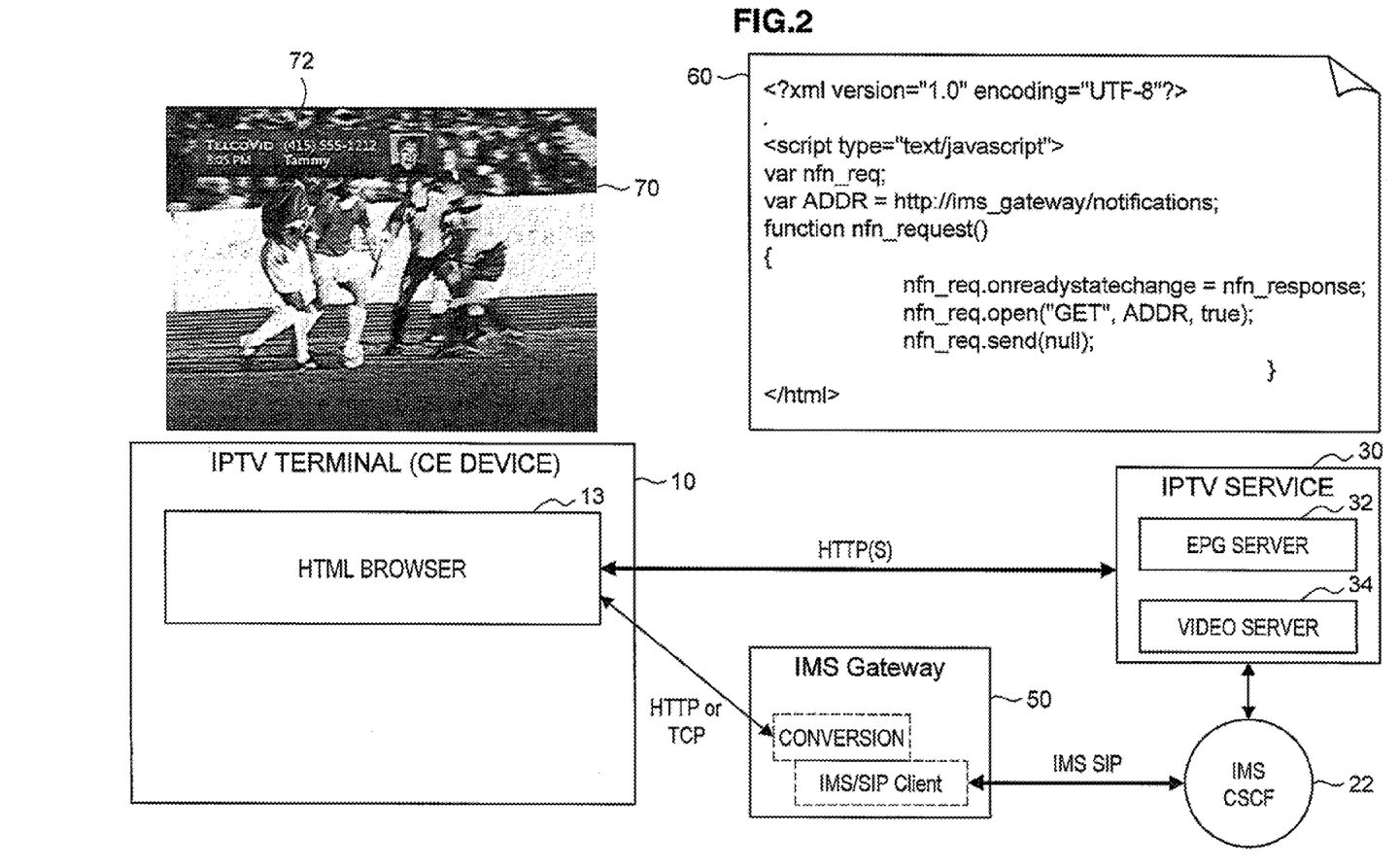
FIG. 2 is a schematic configuration diagram showing an IPTV system using an IMS according to a first embodiment of the present invention.

First, referring to FIG. 2, a schematic configuration of the IPTV system according to the present embodiment will be described. FIG. 2 schematically shows the architecture of the IPTV system according to the present embodiment, and SIP protocol conversion by the IMS gateway.

As shown in FIG. 2, the home network at the user's home 11 includes the IPTV terminal 10 receiving the IPTV service and the gateway device 50 (hereinafter, referred to as an "IMS gateway 50") called "IMS Gateway" compatible with the IMS.

The IMS gateway 50 performs authentication with the IMS network 20 using, for example, a Subscriber Identity Module card (SIM card). Other than that, the IMS gateway 50 provides the IPTV terminal 10 with a session setup function for QoS which is a role of SIP of the IMS, and a communication function using SIP, such as CHAT. A home router for connecting the home network to the IP network is needed. Normally, the function of such a home router is implemented in the IMS gateway 50.

The IPTV terminal 10 is configured by a Consumer Electronics device (CE device) such as the STB, a television receiver, a personal computer or the like, for example. The IPTV terminal 10 is implemented with an HTML browser 13. In the following description, an example is described where an HTML browser specified by CEA-2014 standard, for example, is used as the HTML browser 13.

The HTML browser 13 displays an HTML document 60 (for example, inclusive of an application described by the European Computer Manufacturer Association (ECMA) SCRIPT) provided by the IPTV service 30. With this, the access to the IPTV service 30 is realized by the user of the IPTV terminal 10 operating the screen displayed by the HTML browser 13 by using a user interface such as a remote controller.

The screen of a service application is described in HTML. The communication data between the IPTV terminal 10 and the IMS gateway 50 is also described in the ECMA Script.

Other than that, the HTML browser 13 is implemented with a plug of a media playback player for displaying on a part of the HTML screen or overlaying to display video signals compressed by a predetermined compression coding method, such as MPEG2, H.264/AVC, or the like, for example. Video content provided by the video server 34 of the IPTV service 30 is delivered to the IPTV terminal 10 according to a communication protocol such as Real-time Transport Protocol (RTP), HTTP, or the like. Then, the video content is displayed on the screen of the display device of the IPTV terminal 10 by being extended and drawn by the media playback player provided to the IPTV terminal 10.

According to the IMS-based IPTV system according to the present embodiment, the IPTV terminal 10 can realize the session setup for QoS management for a network transmitting video content, a communication application such as chat, and the like by communicating with the Call Session Control Function (CSCF) 22 of the IMS network 20 via the IMS gateway 50.

For example, FIG. 2 shows an example of a service called "CALLER ID" for displaying an incoming call on a television screen. In this case, the signal of the incoming call has to be notified to the IMS gateway 50 from the IMS network 20 by SIP via CSCF 22, and further, has to be notified to the HTML browser 13 by HTTP or the TCP. The incoming signal notified by the HTML browser 13 is received by an application described in the ECMA SCRIPT, and the application issues a drawing instruction. As a result, as in the example shown in FIG. 2, with the IPTV terminal 10, a telephone number 72 described in the incoming signal is overlaid and displayed on a video image 70 of a television program.

The present embodiment has its characteristics in the method of the IMS gateway 50 of converting data in SIP (first protocol) used in an asynchronous transaction network (for example, the IMS network 20), which is a communication target, to data in HTTP (second protocol) used in a synchronous transaction network (for example, the IP network). That is, the IMS gateway 50 according to the present embodiment has its characteristics in converting protocols in a simple method where a message in SIP protocol is simply turned into a message in HTTP protocol in a direct manner by one-to-one mapping. Note that the IPTV terminal 10 according to the present embodiment corresponds to a synchronous transaction network-compatible device (a device compatible with HTTP communication), and a device having the CSCF 22 located in the IMS network 20 corresponds to an asynchronous transaction network-compatible device (a device compatible with SIP communication).

Figure 3:
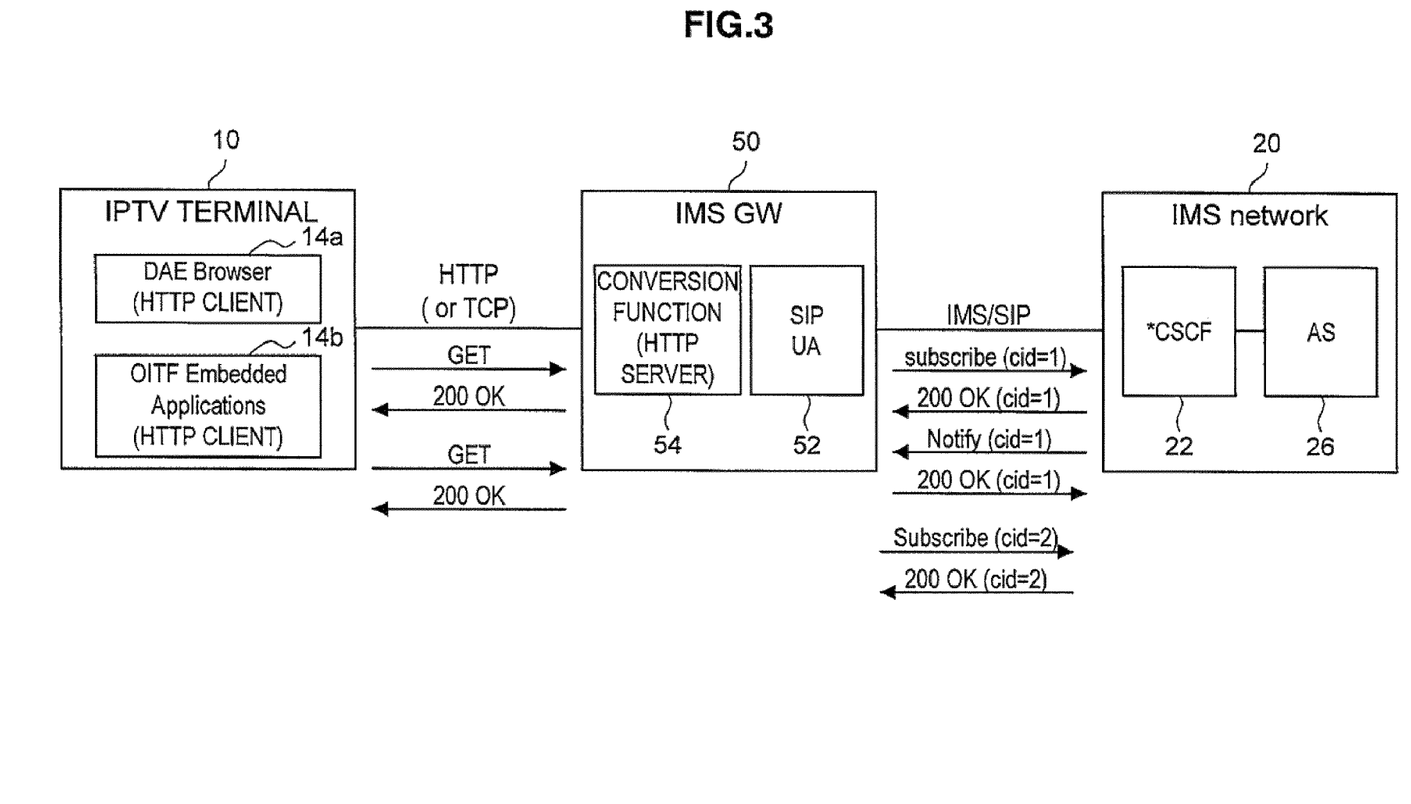
FIG. 3 is an explanatory diagram showing the difference of the protocol between SIP and HTTP according to the present embodiment.

(1) SIP
SIP is based on Peer2Peer communication
Each user agent can initiate SIP methods such as subscribe and notify methods.
SIP UA can support multiple dialog
For examples, both chat and presence applications can communicate simultaneously (Call-ID is used to identify a dialog)
(2) HTTP
HTTP is based on Client/Server communication
Client always imitates HTTP methods
HTTP is stateless communications
No relation among HTTP transactions (a set of HTTP request and response)

FIG. 3 is an explanatory diagram showing the difference of protocol between SIP and HTTP according to the present embodiment. As shown in FIG. 3, SIP is used in Peer2Peer (P2P) communication. SIP UA 52 (USER AGENT) transmits a request message to another party (another SIP UA 52 or a SIP proxy, for example, the CSCF 22), and receives a request message from the other party.

On the other hand, HTTP (or TCP) is used in client/server communication. An HTTP client 14 (for example, a DAE browser 14a, OITF Embedded Applications 14b, etc.) only sends out a request message, and does not receive a request message from another party (for example, HTTP server).

SIP and HTTP have a commonality that a transaction is carried out by receiving a response message to the transmitted request message. Further, with SIP, a management of session called "DIALOG" is performed for a sequence of transactions. On the other hand, the transaction of the HTTP is independent, and is based on a stateless communication where neither of the client and the server holds the states of other transactions.

For example, by using the example shown in FIG. 3, HTTP and SIP will be described in more detail. In the transaction in HTTP, the IPTV terminal 10 (HTTP client) transmits a request of an "HTTP GET method". Then, the IMS gateway 50 (HTTP server) sends back, as an HTTP response to the HTTP request, a status code "200 OK", and a response message storing a requested resource (for example, an HTML document) and the like in the HTTP body. With this, one HTTP transaction is completed. In this case, the HTTP request is one-way from the HTTP client to the HTTP server, and an HTTP request is not transmitted from the HTTP server to the HTTP client. Further, the next transaction of the HTTP request "HTTP GET" and the HTTP response "200 OK" is basically independent from the previous transaction.

On the other hand, with SIP, for example, the SIP UA 52 of the IMS gateway 50 transmits a SIP request (Subscribe) to the AS 26 via the CSCF 22, and receives, as a response to this SIP request, a SIP response (200 OK) from the AS 26. At this time, the SIP UA 52 specifies in the header of the SIP request an arbitrary value (cid=1) called "CALL ID" (shown as "cid" in FIG. 3). In response to the previous SIP request (Subscribe), the AS 26 transmits a SIP request (Notify) to the SIP UA 52. Then, in response to the SIP request (Notify), the SIP UA 52 sends back a SIP response (200 OK) to the AS 26 via the CSCF 22. In this case, to indicate that the SIP request (Notify) is in the same sequence of DIALOG as the previous SIP request, the AS 26 specifies in the header of the SIP request (Notify) the same value (cid=1) as the CALL ID previously specified by the SIP UA 52.

As such, with SIP, the SIP UA 52 of the IMS gateway 50 issues or receives a request message. Further, the session management is performed based on "CALL ID" which is information for identifying each session, and when the CALL ID is different, the session (DIALOG) is different.

The communication method of the IPTV system according to the present embodiment has its characteristics in that the IPTV terminal 10 compatible with the HTTP communication and a device compatible with SIP communicate with each other via the IMS gateway 50 by using a Notification method defined by CEA-2014, for example. More particularly, such a communication method includes the following implementation examples (1) to (4), for example.

(1) A method using only XMLHTTPRequest
(2) A method using XMLHTTPRequest and NotifSocket in combination
(3) A method using XMLHTTPRequest and "$3^{rd}$ party multicast notification (extended)" in combination
(4) A method using only NotifSocket
(1) A method using only XMLHTTPRequest XMLHTTPRequest (hereinafter, referred to as "XHR") is used to perform HTTP communication with a server by using a script language (JavaScript™ or the like) loaded on a web browser. XHR is a mechanism for reading the HTTP transaction from the ECMA SCRIPT of the HTML browser 13, and can be used as a mechanism of In Session Notification in the HTML browser 13 compatible with CEA-2014. The Application Program Interface (API) of such XHR is compliant with World Wide Web Consortium (W3C) standards (http://www.w3.org/TR/XMLHttpRequest/). However, the actual communication protocol is HTTP specified by RFC-2616, and accordingly, the method (1) is a method of converting protocols between HTTP and SIP. However, with the method (1), the conversion function of the IMS gateway 50 does not interpret the SIP message itself, and only performs the simple process of turning a SIP message and a HTTP message to one another in a bidirectional manner.

Figure 4:
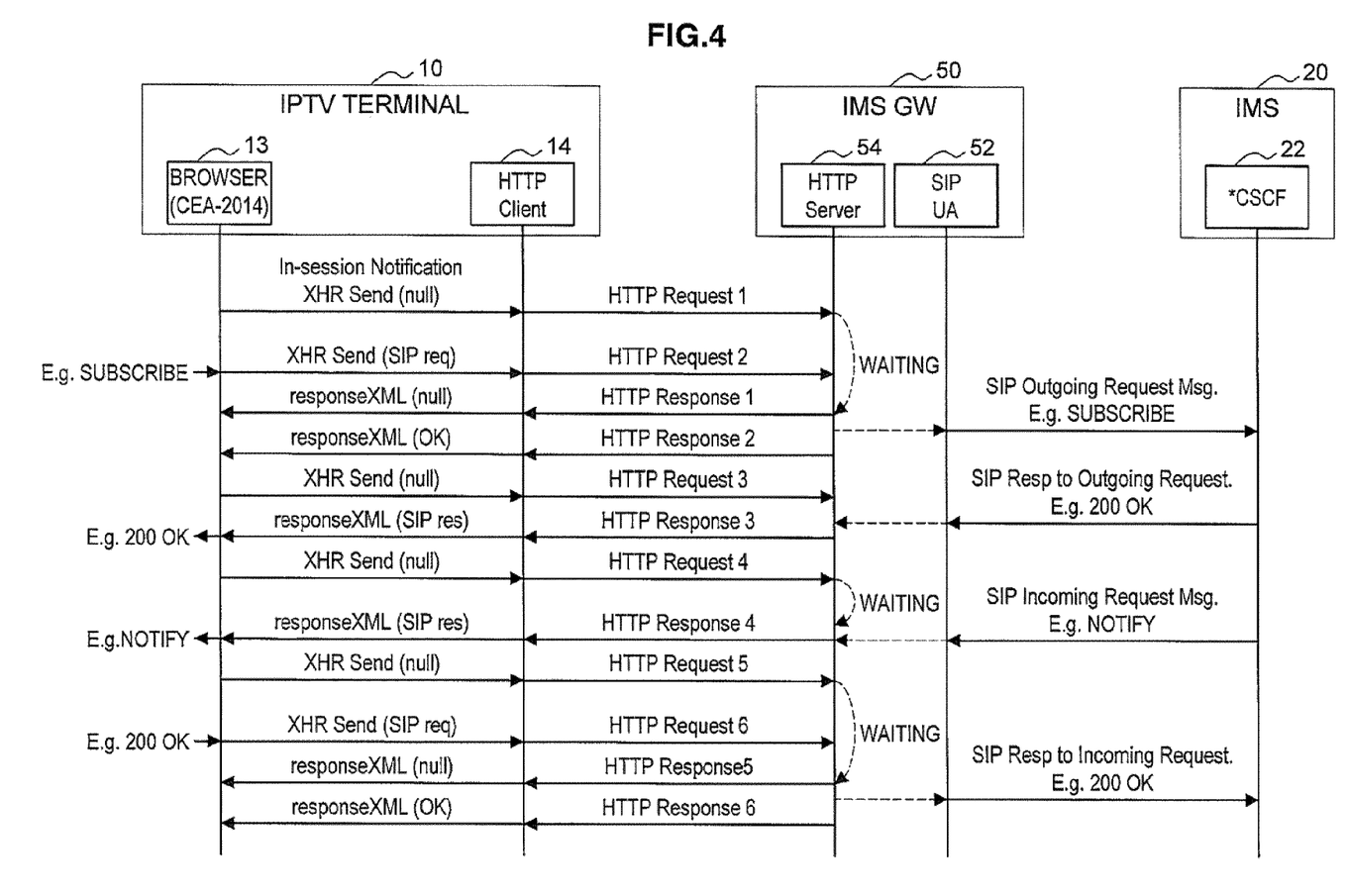
FIG. 4 is a sequence diagram showing a communication method according to the present embodiment.

However, as described above, whereas SIP is based on a P2P communication transaction, HTTP is based on a client/server communication transaction. Thus, the HTTP client 14 of the IPTV terminal 10 and the HTTP server 54 of the IMS gateway 50 notify each other of a request message and a response message as shown in FIG. 4. FIG. 4 shows a method where only XMLHTTPRequest is used.

Figure 5:
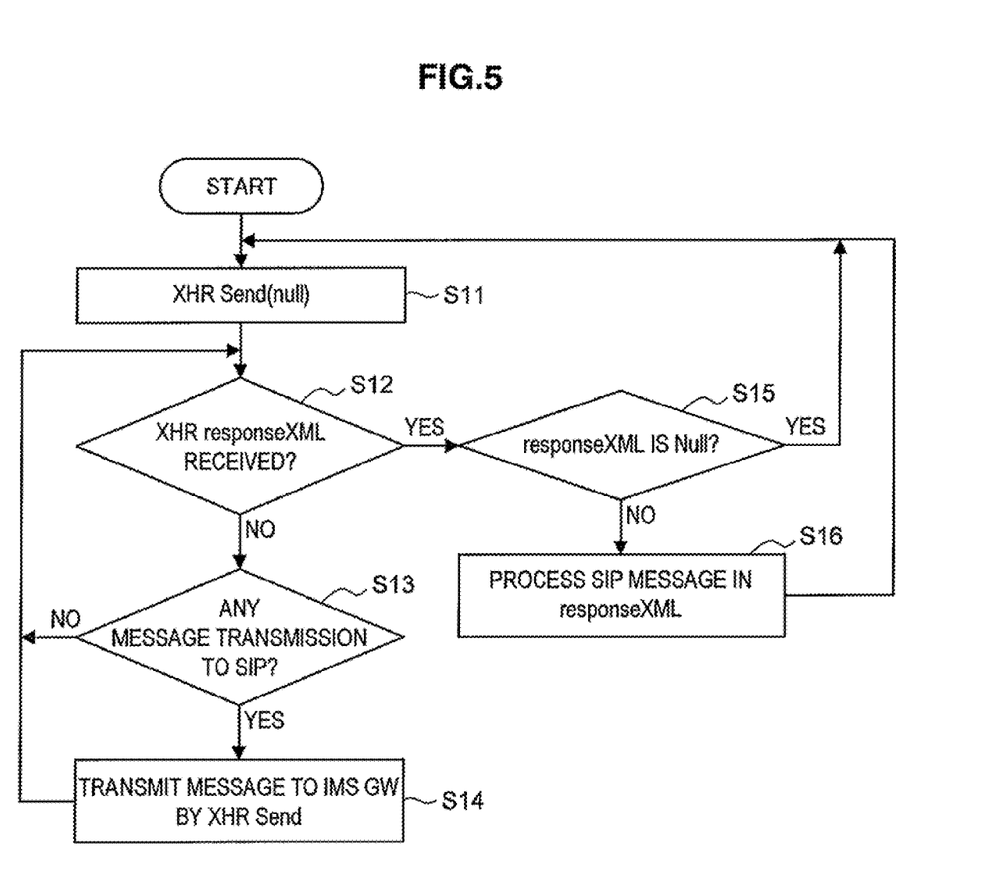
FIG. 5 is a flow chart showing a process of a browser of an IPTV terminal according to the present embodiment.
Figure 6:
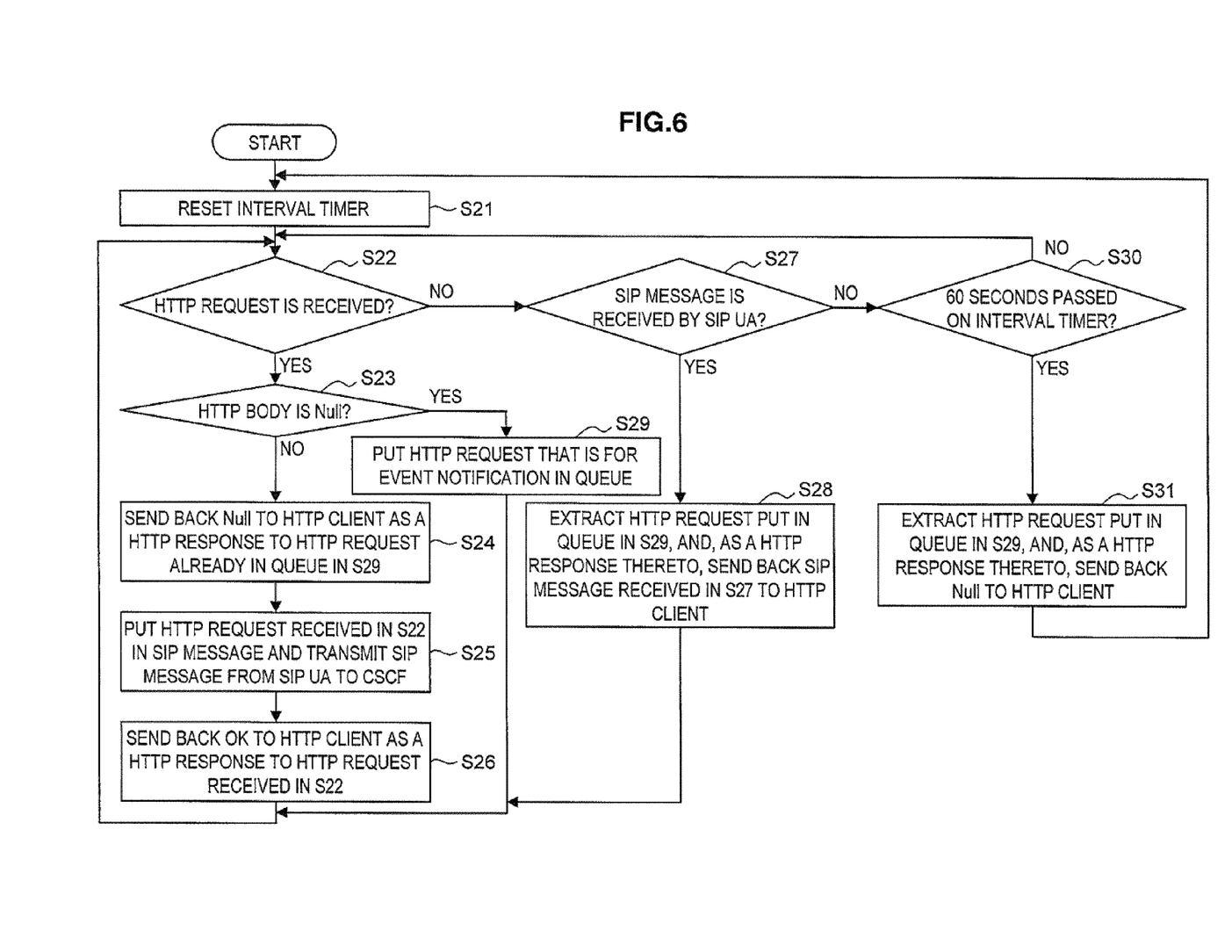
FIG. 6 is a flow chart showing a process of an HTTP server of an IMS gateway according to the present embodiment.

As shown in FIG. 4, a sequence of HTTP transactions (e.g. XHR) carries
  SIP out-going Request Messages
  SIP response messages to SIP out-going request Messages
  SIP in-coming Request Messages
  SIP response messages to SIP in-coming request Messages
  Further, the ECMA SCRIPT that is executed by the HTML browser 13 of the IPTV terminal 10 performs communication by following the flow shown in FIG. 5. FIG. 5 shows a process by the ECMA SCRIPT of the IPTV terminal. Note that, also in a case where the Embedded Application of the IPTV terminal 10 uses the HTTP client 14, the flow is that shown in FIG. 5. Further, the HTTP server 54 of the IMS gateway 50 performs communication by following the flow shown in FIG. 6. FIG. 6 shows a process by the HTTP server of the IMS gateway.

The HTTP request is issued when the ECMA SCRIPT calls the API of XHR send. Here, nothing is specified in the input parameter of the API of send (expressed as "null" in the figure), or a SIP message is input as the input parameter. The HTTP request at this time specifies an URL provided by the IMS gateway 50. For example, the IPTV terminal 10 can know the URL for event acquisition from the device description obtained from the IMS gateway 50 by an Universal Plug & Play (UPNP) standardized device discovery.

Here, the process flow for the ECMA SCRIPT of the HTML browser 13 of the IPTV terminal 10 as shown in FIG. 5 will be described referring to FIG. 4 as necessary.

As shown in FIG. 5, first, when the HTML browser 13 of the IPTV terminal 10 transmits XHR Send (null) to the HTTP client 14 by the ECMA SCRIPT (S11), the HTTP client 14 transmits an HTTP request message to the HTTP server 54 of the IMS gateway 50 (HTTP Requests 1, 3, 4, 5 in FIG. 4). Thereby, start of session can be notified by the IPTV terminal 10 to the IMS gateway 50.

Next, the HTML browser 13 judges whether XHR responseXML is received from the HTTP client 14 or not, that is, whether the IPTV terminal 10 received an HTTP response message from the HTTP server 54 or not (S12).

As a result, when XHR responseXML is not received, the HTML browser 13 judges whether there is a request message (SIP request message) to be SIP-transmitted to the IMS network 20 or not (S13). When there is a SIP request message, the HTML browser 13 transmits XHR Send (SIP req) to the HTTP client 14 (S14), and returns to S12. As a result, the HTTP client 14 transmits a HTTP request message to the HTTP server 54 of the IMS gateway 50 (HTTP requests 2, 6 in FIG. 4). After the HTTP client 14 requests the CSCF 22 for the transmission of predetermined data, when there is no request message to SIP, the HTML browser 13 returns to S12 without transmitting XHR Send (SIP req) to the HTTP client 14.

On the other hand, when XHR responseXML is received in S12, the HTML browser 13 judges whether the received responseXML is Null or not, that is, whether a SIP response message is included in the responseXML or not (S15).

As a result, when the received responseXML is not Null and a SIP response message is included (in case of HTTP Responses 3, 4 in FIG. 4), after performing the processes relating to the SIP response message (S16), the HTML browser 13 returns to S11, and transmits again XHR Send (null) to the HTTP client 14. On the other hand, when the received responseXML is Null (in case of HTTP responses 1, 2, 5, 6 in FIG. 4), the HTML browser 13 returns to S11 without performing any processes, and transmits again XHR Send (null) to the HTTP client 14.

Next, the process flow of the HTTP server 54 of the IMS gateway 50 as shown in FIG. 6 will be described referring to FIG. 4 as necessary.

As shown in FIG. 6, first, the HTTP server 54 of the IMS gateway 50 resets an interval timer (not shown) provided in the IMS gateway 50, and starts timing (S21).

Then, the HTTP server 54 judges whether an HTTP request message is received from the HTTP client 14 of the IPTV terminal 10 or not (S22). Further, when an HTTP request message is received, the HTTP server 54 judges whether the HTTP body of the received HTTP request message is Null or not (S23).

As a result of the judgment, when the HTTP body of the HTTP request received in S22 is Null (in case of HTTP Requests 1, 3, 4, 5 in FIG. 4), the process proceeds to S29. In S29, the HTTP server 54 holds the HTTP request in a holding means, such as a memory, provided in the IMS gateway 50 (S29). To be more precise, in S29, the HTTP server 54 saves the HTTP request message received in S22 in an event queue saved in the holding means, such as a memory, in the order of reception to notify the IPTV terminal 10 of the event from the IMS network 20.

On the other hand, as a result of judgment in S23, when the HTTP body of the HTTP request received in S22 is no Null, and a SIP request message is included, (HTTP Requests 2,6 in FIG. 4), the process proceeds to S24. In S24, the HTTP server 54 sends back to the HTTP client 14 in 200 OK an HTTP response message whose HTTP body is Null as a response to the HTTP request message already saved in the queue in the above-described S29 (HTTP Responses 2, 6 in FIG. 4). Thereby, XHR responseXML (Null) is transmitted from the HTTP client 14 to the HTML browser 13.

Next, in S25, the HTTP server 54 stores in the SIP message the HTTP request message received in S22, and transmits the SIP message from the SIP UA 52 to the CSCF 22 of the IMS network 20 (S25). Further, the HTTP server 54 sends back to the HTTP client 14 an HTTP response message storing 200 OK in the HTTP body as a response to the HTTP request message received in S22 (HTTP Response 3 in FIG. 4).

On the other hand, when it is judged in the above-described S22 that an HTTP request message is not received from the HTTP client 14, the process proceeds to S27. In S27, the HTTP server 54 judges whether the SIP UA 52 received a SIP message from the CSCF 22 or not (S27). When a SIP message is received, the HTTP server 54 sends back to the HTTP client 14 an HTTP response message storing a SIP message in the HTTP body as a response to the HTTP request message already saved in the queue in the above-described S29 (HTTP Response 4 in FIG. 4). Thereby, an XHR responseXML (SIP res) is transmitted from the HTTP client 14 to the HTML browser 13. Note that after the processes of the above-described S26, S29 and S28, the process returns to S22.

On the other hand, as a result of judgment of S27, when a SIP message is not received, the process proceeds to S30. In S30, the HTTP server 54 judges whether the time measured by the interval timer has passed a predetermined time (for example, 60 seconds) or not (S27). As a result, when the time has not passed the predetermined time, the process returns to S22, and when the time has passed predetermined time, the process proceeds to S31.

In S31, the HTTP server 54 sends back to the HTTP client 14 a HTTP response message storing Null in the HTTP body as a response to the HTTP request message already saved in the queue in the above-described S29 (HTTP Responses 1, 5 in FIG. 4). Then, the process returns to S21, and the HTTP server 54 resets again the interval timer (S21), and repeats the processes S22 to S31 similar to those of the above-described processes.

Figure 7:
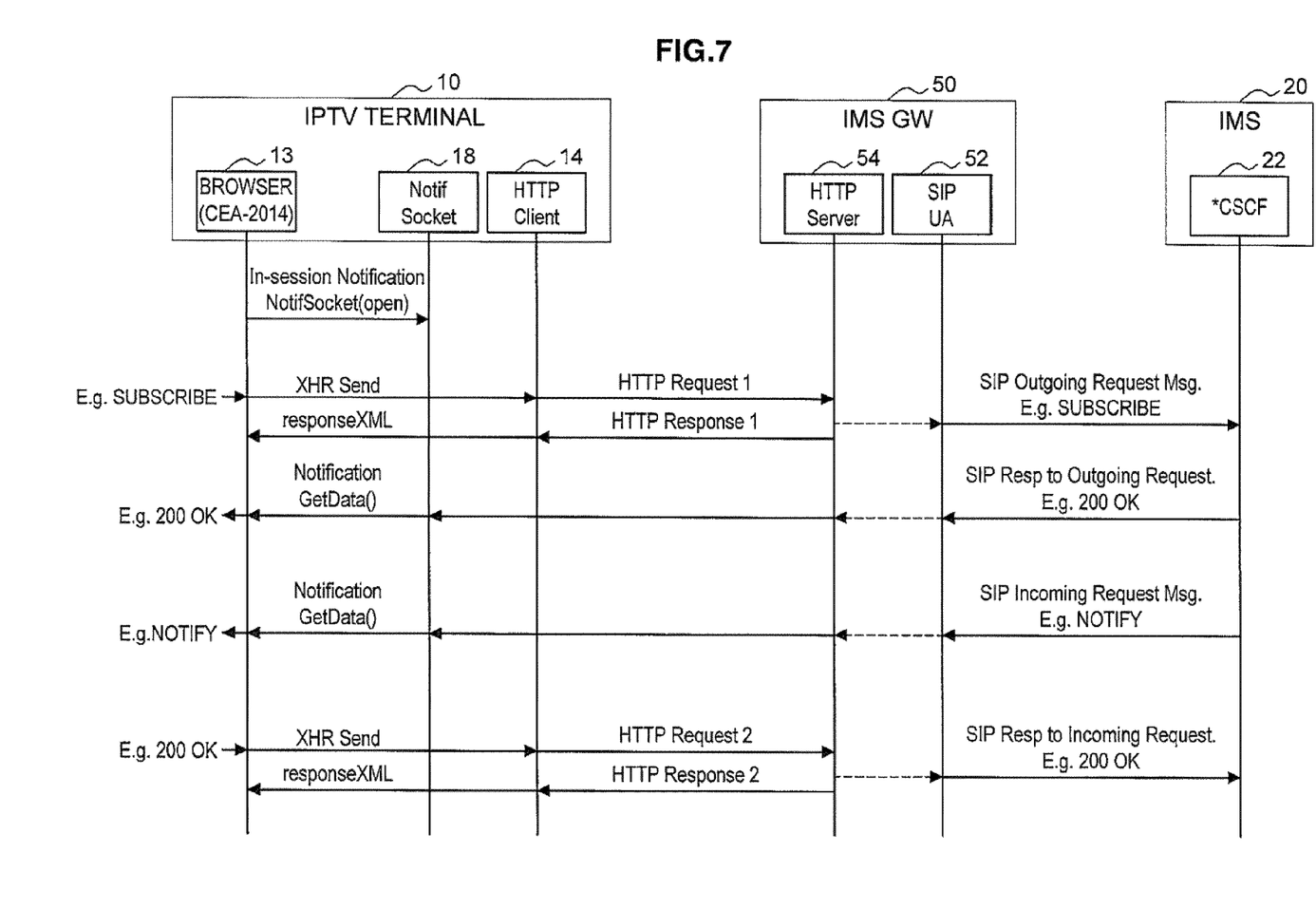
FIG. 7 is a sequence diagram showing a communication method according to a second embodiment of the present invention.

Second Embodiment (2) A method using XMLHTTPRequest and NotifSocket in combination FIG. 7 shows a method using XMLHTTPRequest and NotifSocket in combination.
A sequence of HTTP transactions (e.g. XHR) carries
    SIP out-going Request Messages
    SIP response messages to SIP out-going request Messages
A TCP connection (e.g. CEA 2014 NotifSocket) carries
    SIP in-coming Request Messages
    SIP response messages to SIP in-coming request Messages As shown in FIG. 7, with the method (2), the IPTV terminal 10 is provided with a NotifSocket 18. When transmitting a SIP message from the ECMA SCRIPT of the HTML browser 13 of the IPTV terminal 10, XHR (request & response) is used, and when receiving a SIP message from the IMS gateway 50, the NotifSocket 18 is used. The NotifSocket 18 is a TCP connection, and thus, it can notify of the SIP message transmitted from the CSCF 22 in its original form from the IMS gateway 50 to the ECMA SCRIPT of the browser 13 of the IPTV terminal 10.

Figure 8:
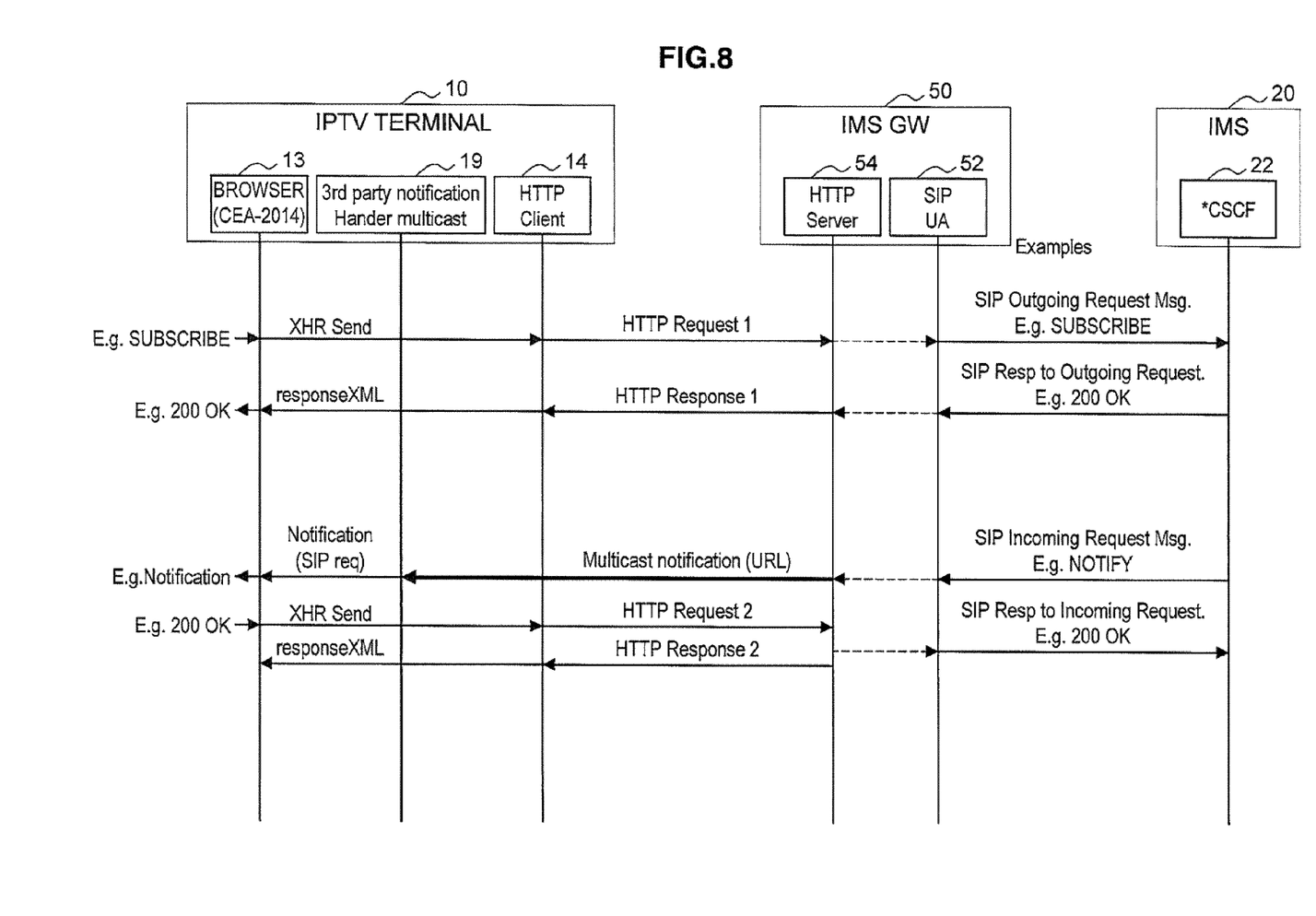
FIG. 8 is a sequence diagram showing a communication method according to a third embodiment of the present invention.

Third Embodiment (3) A method using XMLHTTPRequest and "3$^{rd}$ party multicast notification (extended)" in combination FIG. 8 shows a method using XMLHTTPRequest and "3$^{rd}$ party multicast notification (extended)" in combination.
A sequence of HTTP transactions (e.g. XHR) carries
    SIP out-going Request Messages
    SIP response message corresponding to SIP out-going Request Messages
    SIP response messages to SIP In-coming request Messages
Multicast (e.g. CEA-2014 multicast 3rd party notification with modification) carries
    SIP in-coming request Messages As shown in FIG. 8, with the method (3), the IPTV terminal 10 is provided with a "3$^{rd}$ party notification Hander multicast 19." The method of "3$^{rd}$ party multicast notification" is defined in CEA-2014, and there is a mechanism of notifying a browser of an event by multicast. However, according to the CEA-2014 standard, an URL is notified, and thus, the mechanism cannot be used in case of notifying of a SIP message itself by multicast. Thus, by extending the multicast notification of CEA-2014 and storing a SIP request message in a multicast UDP packet, a SIP message itself can be notified by multicast.

Figure 9:
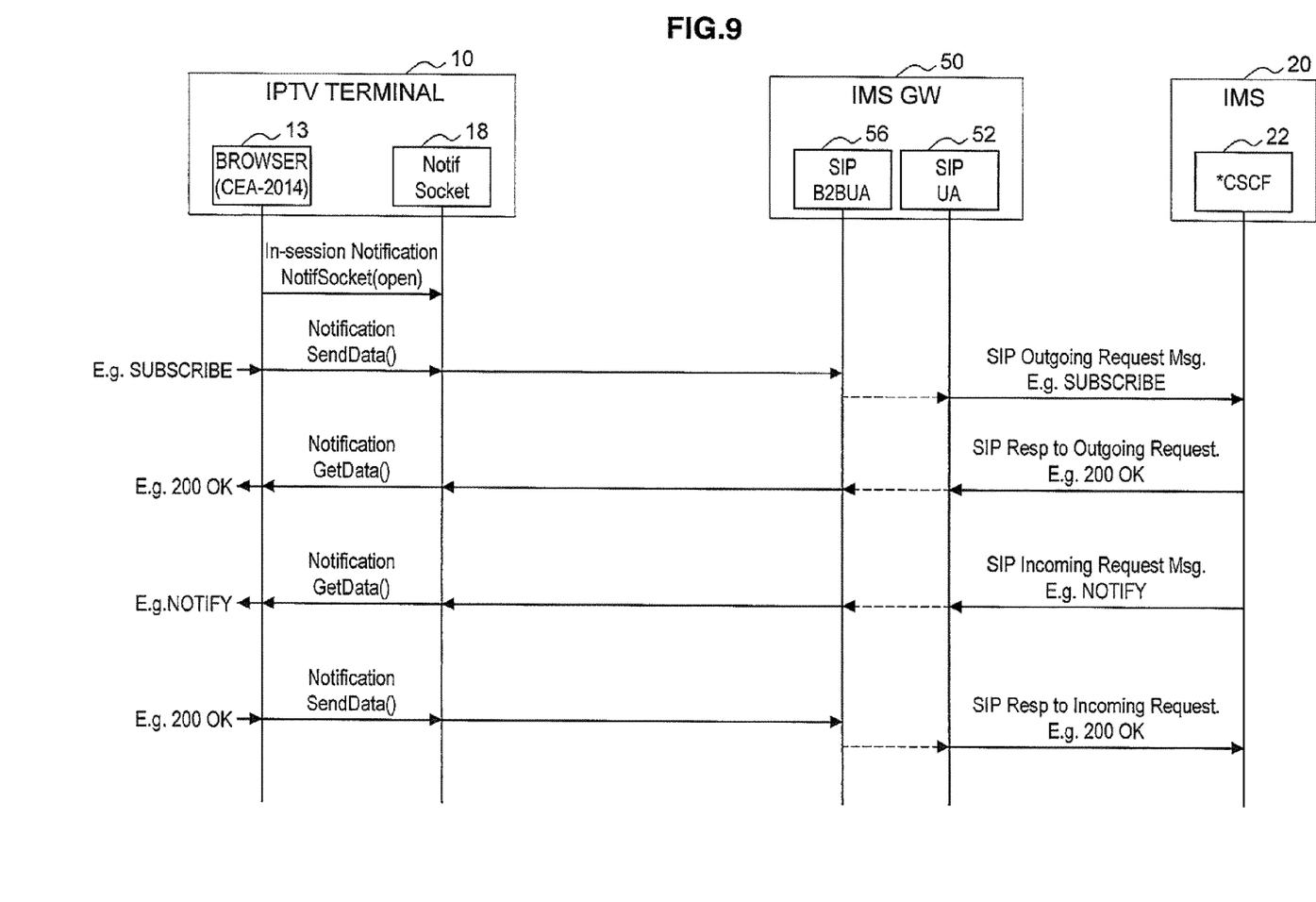
FIG. 9 is a sequence diagram showing a communication method according to a fourth embodiment of the present invention.

Fourth Embodiment (4) A method using only NotifSocket
FIG. 9 shows a method using only NotifSocket.
A TCP connection (e.g. CEA-2014 NotifSocket) carries
    SIP out-going Request Messages
    SIP response messages to SIP out-going request Messages
    SIP in-coming Request Messages
    SIP response messages to SIP in-coming request Messages As shown in FIG. 9, with the method (4), the IPTV terminal 10 is provided with the NotifSocket 18, and the IMS gateway 50 is provided with a SIP B2BUA (Back To Back User Agent) 56 instead of the above-described HTTP server 54. The NotifSocket 18 which is a method of In session Notification of CEA-2014 is an API that can perform TCP communication from the ECMA SCRIPT. Thus, between the IPTV terminal 10 and the IMS gateway 50, a SIP message itself can be placed on the NotifSocket. In this case, the IMS gateway 50 does not need the above-described HTTP server 54, and is implemented with the SIP B2BUA 56.

Heretofore, a configuration of the IMS gateway 50 in the IPTV system according to the present embodiment and a communication method using the same have been described. As described above, in the IMS gateway 50 converting protocols between HTTP and SIP, an application for converting a SIP protocol to a highly abstract high-level interface has to have many hardware resources, such as a CPU, a memory, and the like, and there is a problem of the IMS gateway device 50 becoming expensive.

To the contrary, with the IMS gateway 50 according to the present embodiment, a simple conversion method of turning a SIP message itself into a message in the HTTP protocol is used. Accordingly, the implementation specification of hardware resources, such as a CPU, a memory, and the like, can be reduced, and the IMS gateway 50 can be structured at a low cost. Further, the application of the IPTV terminal 10 can also use the SIP more directly, and thus, it becomes possible to create a high-level application.

It should be understood by those skilled in the art that various modifications, combinations, sub-combinations and alterations may occur depending on design requirements and other factors insofar as they are within the scope of the appended claims or the equivalents thereof.

What is claimed is:

1. A gateway device compatible with a synchronous transaction network and an asynchronous transaction network, comprising:
    a communicating means communicating with a synchronous transaction network-compatible device and an asynchronous transaction network-compatible device; and
    a holding means holding a transaction request received from the synchronous transaction network-compatible device by the communicating means, wherein,
    when an event is received from the asynchronous transaction network-compatible device by the communicating means, the gateway device transmits a message including the event to the synchronous transaction network-compatible device via the communicating means as a response to the transaction request held in the holding means, and
    when a notification is not received from the asynchronous transaction network-compatible device for more than a predetermined time, the gateway device transmits a response to the transaction request held in the holding means to the synchronous transaction network-compatible device via the communicating means.

2. The gateway device according to claim 1,
    transmitting, when a notification other than the event is received from the asynchronous transaction network-compatible device by the communicating means, the response to the transaction request held in the holding means to the synchronous transaction network-compatible device via the communicating means and also a response to the notification other than the event to the asynchronous transaction network-compatible device via the communicating means.

3. The gateway device according to claim 1, wherein
    the communication protocol of the synchronous transaction network comprises HTTP; and
    the communication protocol of the asynchronous transaction network comprises SIP.

4. A communication method of a gateway device compatible with a synchronous transaction network and an asynchronous transaction network, comprising the steps of:
    receiving a transaction request from a synchronous transaction network-compatible device;
    holding the transaction request in a holding means;
    receiving an event from an asynchronous transaction network-compatible device;
    transmitting, in response to receiving the event, a message including the event to the synchronous transaction network-compatible device as a response to the transaction request held in the holding means; and
    transmitting, in case a notification is not received from the asynchronous transaction network-compatible device for more than a predetermined time, a response to the transaction request held in the holding means to the synchronous transaction network-compatible device via the communicating means.

5. The communication method according to claim 4, further comprising the steps of:
    receiving a notification other than the event from the asynchronous transaction network-compatible device; and
    transmitting, in response to receiving the notification other than the event, a response to the transaction request held in the holding means to the synchronous transaction network-compatible and also a response to the notification other than the event to the asynchronous transaction network-compatible device.

6. The communication method according to claim 4, wherein
    the communication protocol of the synchronous transaction network comprises HTTP; and
    the communication protocol of the asynchronous transaction network comprises SIP.

7. A computer-readable medium tangibly storing a program for causing a computer of a gateway device compatible with a synchronous transaction network and an asynchronous transaction network to execute the steps of:
    receiving a transaction request from a synchronous transaction network-compatible device;
    holding the transaction request in a holding means;
    receiving an event from an asynchronous transaction network-compatible device;
    transmitting, in response to receiving the event, a message including the event to the synchronous transaction network-compatible device as a response to the transaction request held in the holding means; and
    transmitting, in case a notification is not received from the asynchronous transaction network-compatible device for more than a predetermined time, a response to the transaction request held in the holding means to the synchronous transaction network-compatible device via the communicating means.

8. A gateway device compatible with a synchronous transaction network and an asynchronous transaction network, comprising:
    a communicating device communicating with a synchronous transaction network-compatible device and an asynchronous transaction network-compatible device; and
    a holding device holding a transaction request received from the synchronous transaction network-compatible device by the communicating device, wherein,
    when an event is received from the asynchronous transaction network-compatible device by the communicating device, the gateway device transmits a message including the event to the synchronous transaction network-compatible device via the communicating device as a response to the transaction request held in the holding device, and
    when a notification is not received from the asynchronous transaction network-compatible device for more than a predetermined time, the gateway device transmits a response to the transaction request held in the holding means to the synchronous transaction network-compatible device via the communicating means.

* * * * *